United States Patent [19]

Benjamin

[11] Patent Number: 5,066,354
[45] Date of Patent: Nov. 19, 1991

[54] BUILDING DRUM FOR A TIRE BELT-TREAD STOCK PACKAGE

[75] Inventor: Gary H. Benjamin, Kenton, Ohio

[73] Assignee: Cooper Tire and Rubber Company, Findlay, Ohio

[21] Appl. No.: 529,091

[22] Filed: May 25, 1990

[51] Int. Cl.⁵ .................................................. B29D 30/24
[52] U.S. Cl. ................................... 156/414; 279/2 R
[58] Field of Search .................... 156/414, 415, 417; 279/2 R

[56] References Cited

U.S. PATENT DOCUMENTS

| | | | |
|---|---|---|---|
| 3,125,482 | 3/1964 | Niclas et al. | 156/414 |
| 3,442,747 | 5/1969 | Brey | 156/417 |
| 3,817,812 | 6/1974 | Yabe | 156/417 |
| 3,873,398 | 3/1975 | Yokoo et al. | 156/417 |
| 4,812,197 | 3/1989 | Wright | 156/417 |
| 4,855,008 | 8/1989 | Terrado | 156/417 |

FOREIGN PATENT DOCUMENTS 0278892  8/1988  European Pat. Off. ............ 156/417

*Primary Examiner*—Willard Hoag
*Attorney, Agent, or Firm*—Joseph G. Nauman

[57] ABSTRACT

A radially expandable and contractable tire building drum has a drawbar positioned along the centerline of the drum, a slidable cone fixed to the drawbar, and a plurality of slides connected to the cone and extending in a radial array therefrom. The slides are guided for motion only radially toward and away from the centerline. Each slide carries a corresponding drum segment having an arcuate outer surface, and the surfaces of the segment cooperate to form a cylindrical building surface on the drum exterior. Motion of the drawbar along the centerline cause the conical adjusting member to move the slides concurrently in a radial direction, expanding or contracting the building surface. Edges of the drum segments arcuate surfaces include scallops, as in the form of tongues and corresponding cavities, which cooperate as the drum segments move outward to maintain some surface continuity lengthwise of the drum building surface.

10 Claims, 2 Drawing Sheets

BUILDING DRUM FOR A TIRE BELT-TREAD STOCK PACKAGE

BACKGROUND OF THE INVENTION

This invention relates to an apparatus for the assembly of radial tire components, and more particularly, to a building drum for the assembly of a belt-tread stock package for subsequent use in the final two-stage assembly step of a radial tire, at which operation the belt-tread stock package is attached to and consolidated with a carcass which is previously assembled on a first stage assembly machine.

When applying the two-stage method of assembling a modern radial tire, it is common to use a first stage carcass assembly machine and a second stage machine on which the carcass from the first stage is chucked by its beads and then transformed from a cylinder into a toroidal shape, at which time the belt-tread stock package is added to the carcass, and the assembly is then consolidated by stitching the two tacky subassemblies together.

The basic elements of a modern radial ply pneumatic tire for automobile and light truck use consist of an inner liner, one or more plies, sidewalls, beads, fillers and other bead reinforcements, all of which, when properly assembled, form a subassembly called a first stage carcass, as well as a belt-tread stock subassembly comprising one or more belts incorporating steel cord or other suitable cord materials and a length of tread stock combined to form a belt-tread stock package. The first stage carcass and the belt-tread stock package are then combined into a green tire, which is subsequently molded and cured in a vulcanizer.

A form of apparatus for building and combining the two assemblies is described in U.S. Pat. No. 4,402,782 issued Sept. 6, 1983 to the assignee of this application, includes a machine for building a first stage carcass, a second machine for building a separate and distinct second stage radial tire belt-tread stock package, a means to convey the belt-tread stock package into circumferential coaxial contact with the shaped carcass, and stitching means for consolidating the two assemblies into a green tire.

In particular, FIGS. 2 through 6 of that US patent show a form of building drum for use in assembling the belts and tread stock, such drum having a plurality of drum segments with arcuate outer shoe members which cooperate to form the building surface of the drum. Those segments are supported, and radially adjusted, through a set of links, connecting pins, and a pair of axially adjustable spider members. The spider members are moved toward and away from each other by pneumatic cylinders, and a rack and pinion mechanism connects the two spider members to coordinate their motion. While this construction has been effective, it is not suited for incorporation into an automated tire assembly system due to its design concept. Furthermore, the shoe members, having straight sides which extend parallel to the central shaft of the drum mechanism, will present wider gaps between them as the drum mechanism is expanded to handle larger diameter belt/tread stock packages.

Consequently, in an attempt to automate certain tire assembly operations it was noted that there was a need for a building drum that is programmable, remotely adjustable, which requires relatively few parts, is simple in design, accurate when being set to specific building diameters, and inexpensive to manufacture and maintain. In addition, there has been a need to increase the building diameter range of the various drum sections minimizing the gaps between the drum segments, such that essentially continuous support is being provided for the belt components, in particular, as they are being placed and assembled on the drum surface.

SUMMARY OF THE INVENTION

The present invention provides a tire belt-tread stock package building drum having a central control drawbar coaxially positioned about the drum centerline, a plurality of shoe members having uniquely shaped arcuate outer surface members or drum segments attached to them and which cooperate to define the building surface of the drum. Each drum segment may be removably mounted to a corresponding shoe member, to allow replacement with similar shoe members of different dimensions, should it be desired to alter the range of radial adjustment of the drum surface. The adjustment mechanism for the shoe members, and the drum segments carried thereon, is provided by a single axially movable adjusting member, preferably in the form of a cone attached to the drawbar with the cone axis coincident with the drum centerline. A plurality of right triangular slides cooperate with the cone adjusting member to translate its axial motion into a radially directed motion of the shoe members.

The hub of the drive spindle which rotates the drum includes a radially extending flange carrying a plurality of radially extending tracks or guides, each receiving and guiding a radially extending edge of a slide, while the shoe members are connected to the axially directed edges of the slides. The remaining edges of the triangular slides (their hypotenuse) are captured and guided within tracks on the conical surface of the cone adjusting member. Therefore, axial motion of the drawbar translates directly into radial motion of the shoe members and the drum segments carried thereon.

In a preferred embodiment of the invention, each drum segment has scalloped or non-linear edges, portions of which are not parallel to the axis of the drum. These edges of the drum segments are complementary, thus each drum segment has a first scalloped edge including one or more tongues or extensions cooperating with like-shaped grooves or depressions in an adjacent edge of the next adjacent drum segment. Therefore, as the gaps between the drum segments are widened, these cooperating tongues extend across the gaps to avoid a total widened space lengthwise of the effective drum surface.

Preferably, each drum segment also includes at least one elongated permanent magnet strip inserted into a longitudinally directed slot along its outer surface.

The primary object of this invention, therefore, is to provide an adjustable building drum on which various sizes of belt-tread stock packages can be assembled, which drum has novel size adjustment mechanism for increasing/decreasing the effective diameter of the drum, using positively engaged slide and guide parts to translate axial motion of an adjustment input into corresponding radial motion of a drum segments making up the building surface of the drum; to provide such a drum wherein the interacting edges of the drum segments are complementarily scalloped to avoid the existence of widening gaps the full length of the drum as it is enlarged in circumference; and to provide permanent magnets in the drum segments surfaces for interacting with steel cord in the tire belts to assist in holding the belts in position on the drum surface.

Other objects and advantages of the invention will be apparent from the following description, the accompanying drawings, and the appended claims.

DESCRIPTION OF THE PREFERRED EMBODIMENT

The general arrangement of a building drum for a belt-tread stock package is illustrated in U.S. Pat. No. 4,402,782 as having a head stock including a motor drive coupled to and rotating a hollow shaft or spindle, on which is supported the improved building drum of the present invention.

Figure 1:
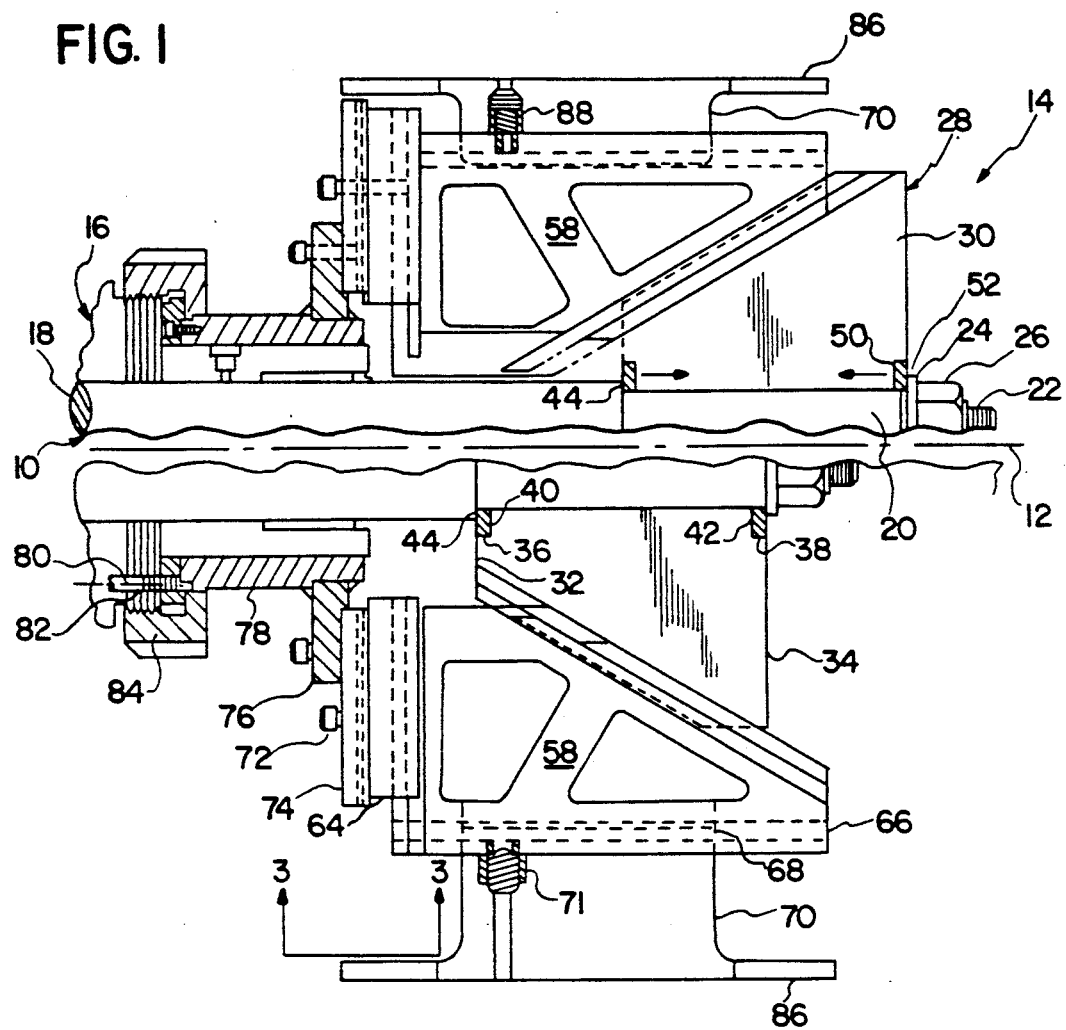
FIG. 1 is a cross-section of a drum assembly according to the invention with the drum parts shown in a fully retracted position above the centerline and in a radially expanded position below the centerline.

Referring to FIG. 1, an annular drawbar 10, is coaxially positioned about the centerline 12 of the building drum, generally designated 14. The drum is supported at one end by connection to the conventional hollow head stock spindle 16, through which the drawbar extends into the headstock mechanism. A suitable control, such as a gear drive D from a stepping motor (M), is attached to move drawbar 10 lengthwise, as viewed in FIGS. 1 and 5. The drawbar 10 has a first cylindrical portion 18 which extends through a bushing at the headstock shaft, an undercut portion 20 and a threaded end portion 22. The threaded end portion 22 is provided with a retaining washer 24 and a retaining nut 26.

Circumferentially mounted about drawbar 10, coaxially of centerline 12 is an axially movable adjusting member 28 having a radially diverging conical outer surface 30, a first smaller end 32 and a second larger end 34 respectively. The center of the member 28 is bored to fit on drawbar 10. Both ends 32 and 34 include respective shallow counterbores 36 and 38, respectively, adapted to receive washers 40 and 42, respectively. Washer 40 is seated against shoulder 44 at the intersection of drawbar portions 18 and 20. Washer 42 is engaged by washer 24 when nut 26 is tightened, to secure the member 28 to drawbar 10.

Figure 2A:
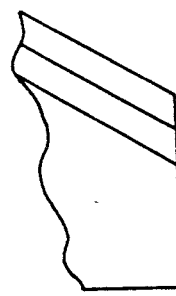
FIGS. 2A and 2B are enlarged partial cross-section views showing details of an elongated slot on the adjusting cone surface and the corresponding T-shaped mounting root of a slide.
Figure 2B:
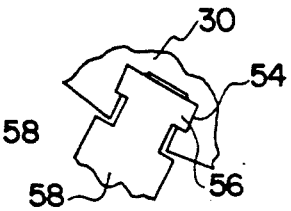

Referring to FIGS. 1 and 2, equally spaced about the cone surface 30 are axially directed elongated slots 54, each adapted to receive a corresponding T-shaped mounting root 56 of a right triangular slide 58. Each slide 58 further includes an axially extending T-shaped mounting root 60 (FIG. 3) for slidably mating with a corresponding radially elongated slot 62 on a slide retainer 64, and an axially extending T-shaped mounting root 66 for receiving a corresponding axially elongated slot 68 of a shoe member 70.

Figure 3:
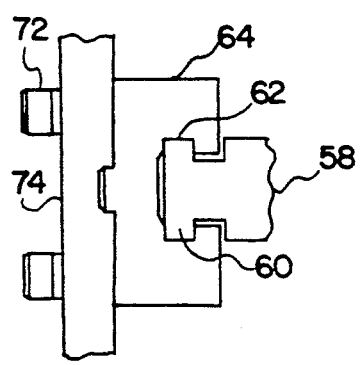
FIG. 3 is an enlarged partial cross-section view of an elongated slot on the radially extending slide guide and a corresponding T-shaped mounting root of a slide.

As shown in FIGS. 1 and 3, slides or guides 64 are mounted by screws 72 to a slide retainer ring 74 which is secured to a mounting flange 76. The mounting flange 76 is provided with an end ring 78 having a positioning pin 80 for mating with an index hole 82 located in head stock spindle 16. A lock nut 84 is threaded onto the head stock spindle 16 to retain building drum 14 in a predetermined location around spindle 16.

Figure 4:
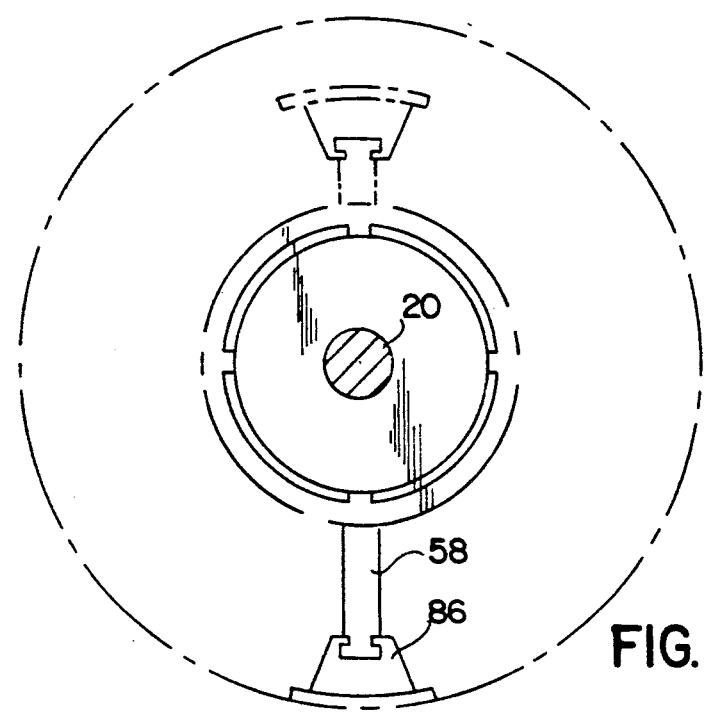
FIG. 4 is an end view of the drum assembly showing the drum segments in an expanded adjusted position in phantom lines.

As shown in FIGS. 1 and 4, each shoe member 70 includes a drum segment 86 mounted thereon by suitable studs 88. This arrangement enables the drum segments and shoe members, to be removed, replaced, or realigned.

Figure 6:
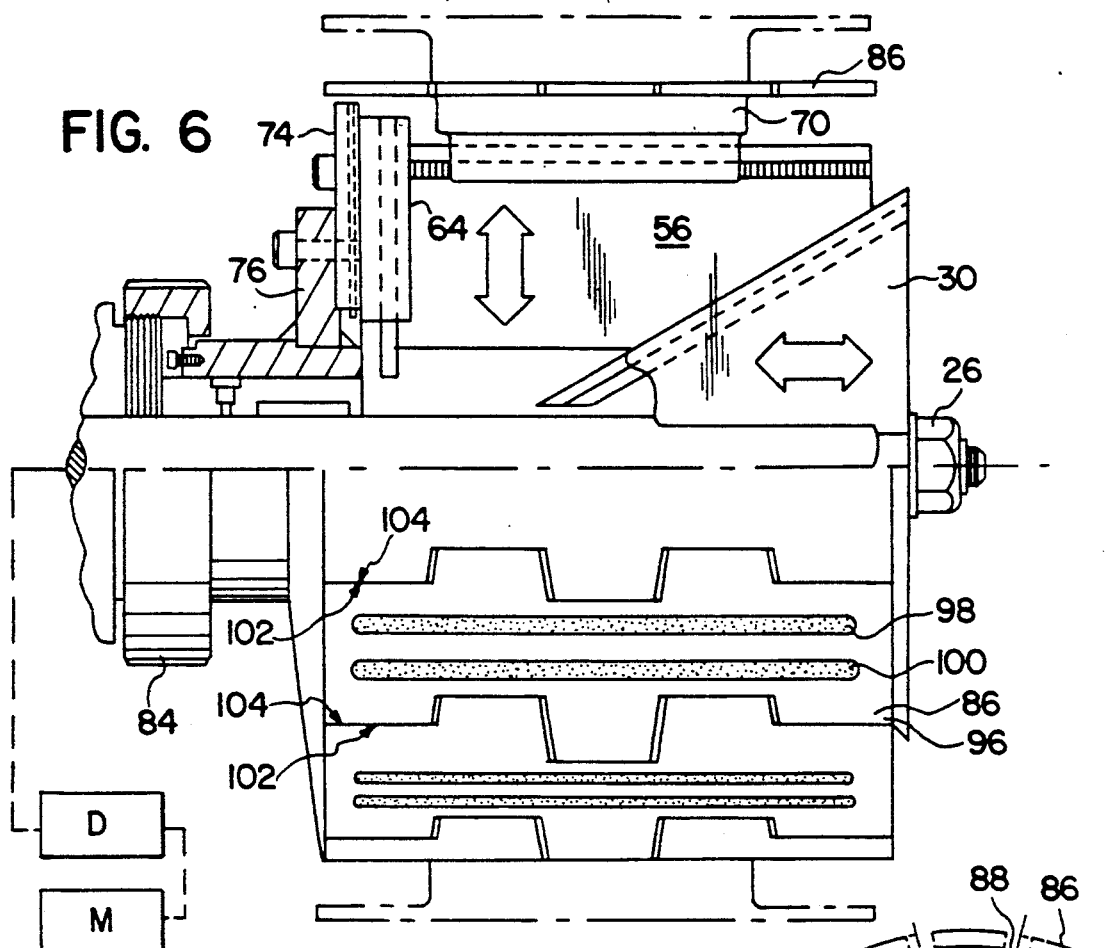
FIG. 6 is an end view of a slide extension and a modified shoe member.

If it is desired to expand the range of diametric adjustment, so as to have the capability to build tires over a wide range of different sizes, adding slide extensions 90 of various lengths will accomplish an increase in the basic diameter of the building drum structure. As shown in FIG. 6, extension 90 includes a slot 92 for mating with the corresponding mounting root 66 of slide 58, and a T-shaped mounting root structure 94 corresponding to the elongated slot 68 of shoe member 70. Each extension 90 is locked into position with respect to a corresponding slide 58 and shoe member 70 by suitable lock screws similar to lock screw 71.

In use, as shown in FIGS. 1 and 4, shoe members 70 are accurately radially positioned for the desired tire diameter size by axially advancing or retracting drawbar 10, which carries adjusting member 28 with it. Moving member 28 to the left (FIGS. 1 and 5) forces each slide 58 and drum segment 86 to move radially outwardly from the centerline 12, radially expanding the building drum. Conversely, moving drawbar 10 to the right forces each slide 58 and member 86 to move inwardly toward centerline 12 to contract the building drum.

A belt-tread stock package is formed by placing the end of uncured rubber belt material, which has been combined with a steel or similar cord belt, on the outer surfaces of the drum segments 86 and rotating the drum one complete revolution, after which the belt material is severed by the operator and the ends fitted together. Additional belts can be applied in the same manner and the tack of the uncured rubber of the individual belts will cause them to adhere to one another. In doing so, the next belt applied after the first one will have its seam or joint offset around the subassembly by rotating the drum 180° before beginning to apply the next length of belt material. U.S. Pat. No. 4,402,782 describes the process in detail, and U.S. Pat. No. 4,333,788 discloses servicer mechanisms for supply the components (e.g. belts) to a building drum. These patents were issued to the assignee of this application, and their disclosures are incorporated herein by reference.

Next, a length of treadstock material is applied over the belts. Mechanism for supplying lengths of such material, and for performing this application, is disclosed in U.S. Pat. No. 4,820,373 issued to the assignee of this application, which is also incorporated herein by reference.

The belt-treadstock assembly is then released by positively retracting in unison each shoe member 86 and transporting the assembly for circumferential coaxial contact and consolidation with the outer surface of a first stage carcass. A transfer device for this purpose is disclosed in said U.S. Pat. No. 4,402,782, FIGS. 7-14.

In a preferred embodiment of the invention, as shown in FIG. 6, each drum segment 86 includes at least one elongated magnetic strip 98 inserted into a corresponding longitudinally directed slot 100 along its outer surface 96. When producing steel-belted radial ply tires, the magnetic strips 98 attract the steel cord in the belt material and assist in holding the belts on the drum during assembly.

Figure 5:
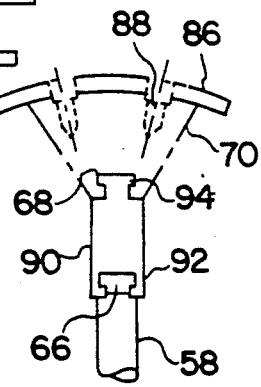
FIG. 5 is a side elevation view, with the upper part in cross-section, of the drum assembly.

As shown in FIG. 5, first and second surfaces 102 and 104 respectively, of each drum segment 86 are scalloped such that when the drum is in a fully retracted position a first edge 102 of one drum segment has at least one circumferentially extending tongue or extension 103, and cooperates with the opposed edge 104 of an adjacent drum segment 86, and a complementary depression or edge cavity 104 to present a cylindrical outer surface interrupted by the interfaces of the adjoining edges of the drum segments. When the drum is expanded, the drum segment edges 102 and 104 part, but the extensions or tongues 103 remain partially within the opposed depressions or cavities 105 and extend across the gaps between the drum segments to avoid a total widened space lengthwise of the effective drum surface. Thus, even when expanded the building drum provides good circumferential support for the belts and tread stock.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tire building drum with an expandable and contractible building surface comprising:
    means defining a centerline for the building drum;
    an adjusting member including a cone surface coaxially positioned about said centerline;
    means for axially advancing and retracting said adjusting member along said centerline;
    a plurality of slides and means supporting and constraining said slides for movement radially of said centerline, said slides having slidable connections to said cone surface;
    a drum segment connected to each said slide and cooperating to define a building surface on the drum;
    whereby said slides are mechanically connected for movement radially with respect to said centerline in response to motion of said adjusting member axially of said centerline to expand and contract the effective building surface of the drum;
    a plurality of annular shoe members each supporting one of said drum segments, each said shoe member having an adjustable mounting to one of said slides;
    said annular shoe members each having complementary scalloped first and second edges transverse to the building surface such that said scalloped edges of adjacent said shoe members cooperate with each other to provide partial building surface continuity as the shoe members are concurrently moved in and out to different locations along radii of the drum.

2. A tire building drum as defined in claim 1 wherein at least some of said drum segments include an elongated permanent magnetic strip for attracting ferrous materials incorporated in belts supplied to the drum.

3. A tire building drum as defined in claim 1, wherein said means for axially advancing and retracting said adjusting member comprises a drawbar coaxially positioned on said centerline and connected to cause movement of said cone surface which adjusts said slides in a radial direction.

4. A tire building drum as defined in claim 1 wherein said slides have mounting roots at their edges and said cone surface has corresponding axially directed elongated slots, each said slot receiving one of said mounting roots to position said slides in radially directed array around said cone surface.

5. A tire building drum as defined in claim 1, further comprising extensions adapted to fit between each of said slides and its corresponding drum segment.

6. A tire building drum with an expandable and contractible building surface, said drum having means defining a longitudinal centerline for said building surface comprising:
    a plurality of drum segments having arcuate surfaces cooperative to define a cylindrical drum surface;
    a conical adjusting member coaxially positioned about the centerline;
    a plurality of slides connected to said conical adjusting member and supporting said drum segments in a circular array about the centerline;
    a plurality of radially extending guides connected to each slide and confining said slides to radial motion with respect to the centerline in response to motion of said conical adjusting member along the centerline;
    whereby axial motion of said cone along said centerline will move said drum segments concurrently radially toward and away from said centerline to change the effective diameter of the drum building surface defined by the drum segments;
    each of said annular drum segments having complementary scalloped edges extending axially of the drum structure and cooperating with the edges of adjacent drum segments to define a cylindrical surface of variable diameter which maintains some surface continuity in a direction longitudinally of the drum when the drum segments are moved to different radial positions.

7. A tire building drum as defined in claim 6 further comprising
    slide extensions adapted to be fitted between each said slide and a corresponding said drum segment.

8. A tire building drum as defined in claim 6 wherein said drum segments each include said arcuate outer surface at least one magnet for exerting a holding force on tire belts containing ferrous reinforcing material.

9. A tire component building drum with an expandable and contractible building surface comprising:
    radially extending drum segments,
    means defining a centerline for the drum,
    means supporting said segments about said centerline and for adjusting the position of said segments radially of said centerline and
    said drum segments having arcuate outer surfaces and having interfitting non-linear edges extending generally lengthwise of the drum for defining a circumferential building surface of variable diameter depending upon the position of said segments.

10. A building drum as defined in claim 9, wherein one of said interfitting edges has at least one tongue extending therefrom as a continuation of the arcuate surface and the opposite edge has at least one depression shaped to receive a tongue on an adjacent drum segments as the drum segments are moved into close proximity to each other, said tongues and depressions cooperating when the drum segments are moved radially outward of the drum to provide partial longitudinal continuity to the thus expanded drum surface.

* * * * *